United States Patent
Johnson et al.

(10) Patent No.: US 10,158,730 B2
(45) Date of Patent: Dec. 18, 2018

(54) CONTEXT BASED COMMUNICATION MANAGEMENT

(71) Applicant: AT&T Intellectual Property I, L.P., Atlanta, GA (US)

(72) Inventors: Jeffrey Paul Johnson, Austin, TX (US); Larry B. Pearson, San Antonio, TX (US); James H. Pratt, Round Rock, TX (US); Randolph Wohlert, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 145 days.

(21) Appl. No.: 14/066,833

(22) Filed: Oct. 30, 2013

(65) Prior Publication Data

US 2015/0120829 A1    Apr. 30, 2015

(51) Int. Cl.
*G06Q 10/10* (2012.01)
*H04L 29/08* (2006.01)

(52) U.S. Cl.
CPC ............. *H04L 67/22* (2013.01); *H04L 67/18* (2013.01); *H04L 67/306* (2013.01)

(58) Field of Classification Search
CPC ... G06Q 10/10; H04L 29/06; H04L 29/08072; H04L 29/06027; H04L 12/581
See application file for complete search history.

(56) References Cited

U.S. PATENT DOCUMENTS

| | | |
|---|---|---|
| 7,343,365 B2 | 3/2008 | Farnham et al. |
| 7,761,549 B2 | 7/2010 | Farnham et al. |
| 8,326,328 B2 | 12/2012 | Lebeau |
| 8,346,898 B2 | 1/2013 | Marcus et al. |
| 8,429,119 B2 | 4/2013 | Gorti et al. |
| 8,514,226 B2 | 8/2013 | Zafar et al. |
| 2007/0124396 A1* | 5/2007 | Febonio ............... G06Q 10/107 709/206 |
| 2008/0172461 A1* | 7/2008 | Thattai .................. G06Q 10/00 709/204 |
| 2009/0327928 A1 | 12/2009 | Dedis et al. |

(Continued)

FOREIGN PATENT DOCUMENTS

WO   PCT/US2010/022955    8/2010
WO   PCT/CA2010/000540    10/2010

OTHER PUBLICATIONS

"LinkedIn Introduce "New Job" Updates for Your Connections" downloaded from https://www.linkedin.com/groups/LinkedIn-Introduce-New-Job-Updates-2087986.S.107223549, dated Feb. 23, 2015.
Roth M., et al., "Suggesting Friends Using Implicit Social Graph," *Proceedings of the 16th ACM SIGKDD International Conference on Knowledge Discovery and Data Mining*, ACM, 2010.

(Continued)

*Primary Examiner* — Vivek Srivastava
*Assistant Examiner* — Hien V Doan (57) ABSTRACT

Methods and computer-readable media for providing a recommendation and for rerouting calls are disclosed. For example, a method detects updated status information regarding a contact of a user and determines whether the updated status information signifies an event of interest. When the updated information is determined to signify an event of interest, the method provides to a device of the user a recommendation that the user should communicate with the contact. The recommendation includes an indication of the event of interest.

20 Claims, 6 Drawing Sheets

(56) References Cited

U.S. PATENT DOCUMENTS

| | | | |
|---|---|---|---|
| 2011/0154208 A1* | 6/2011 | Horii | H04L 67/22 |
| | | | 715/736 |
| 2011/0161827 A1 | 6/2011 | Dedis et al. | |
| 2011/0208814 A1 | 8/2011 | Bostrom et al. | |
| 2011/0314017 A1 | 12/2011 | Yariv et al. | |
| 2012/0066073 A1* | 3/2012 | Dilip | G06Q 30/0269 |
| | | | 705/14.66 |
| 2012/0102409 A1* | 4/2012 | Fan | H04W 4/00 |
| | | | 715/738 |
| 2012/0284341 A1 | 11/2012 | Masood et al. | |
| 2013/0051542 A1 | 2/2013 | Yao et al. | |
| 2013/0054749 A1 | 2/2013 | Yao et al. | |
| 2013/0073473 A1 | 3/2013 | Heath | |
| 2013/0298030 A1* | 11/2013 | Nahumi | H04W 4/04 |
| | | | 715/733 |
| 2013/0339464 A1* | 12/2013 | Goudarzi | H04L 61/1547 |
| | | | 709/206 |
| 2014/0156746 A1* | 6/2014 | Wheatley | H04L 67/22 |
| | | | 709/204 |
| 2014/0164528 A1 | 6/2014 | Kleppmann et al. | |
| 2014/0207860 A1* | 7/2014 | Wang | H04L 65/403 |
| | | | 709/204 |
| 2015/0006286 A1 | 1/2015 | Liu et al. | |

OTHER PUBLICATIONS

Viegas, F. B., et al., "Social Network Visualization: Can We Go Beyond the Graph," *Workshop on Social Networks, CSCW*, vol. 4, 2004.

\* cited by examiner

CONTEXT BASED COMMUNICATION MANAGEMENT

The present disclosure relates generally to communication networks and, more particularly, to methods, computer-readable media and devices for recommending communications to users and for rerouting calls to users based upon user relationship information.

BACKGROUND

Users have multiple identities that they use for communications, e.g., multiple email addresses, multiple telephone numbers, cell phone numbers, and application identities, such as user names for messaging services, voice over internet protocol (VoIP) applications, and so forth. A user uses these different identities for different purposes and to communicate with different people. For instance, a user may not want to interact with personal friends using a work email or a work telephone number. Similarly, the user may prefer that business contacts not be able to reach the user outside of business hours.

SUMMARY

In one embodiment, the present disclosure discloses a method for providing a recommendation. For example, the method detects updated status information regarding a contact of a user and determines whether the updated status information signifies an event of interest. When the updated information is determined to signify the event of interest, the method provides to a device of the user a recommendation that the user should communicate with the contact. The recommendation includes an indication of the event of interest.

In another embodiment, the present disclosure discloses a non-transitory computer-readable medium storing instructions which, when executed by a processor, cause the processor to perform operations for providing a recommendation. The operations include detecting updated status information regarding a contact of a user and determining whether the updated status information signifies an event of interest. When the updated information is determined to signify the event of interest, the operations further include providing to a device of the user the recommendation that the user should communicate with the contact. The recommendation includes an indication of the event of interest.

In still another embodiment, the present disclosure discloses a method for rerouting a call. For example, the method receives an incoming communication from a device of a caller destined to a first device of a user. The incoming communication is associated with a first identity of the user. The method then determines whether the device of the caller is permitted to contact the user via the first identity. When the device of the caller is not permitted to contact the user via the first identity, the method determines whether the device of the caller is permitted to contact the user via a second identity. When the device of the caller is permitted to contact the user via the second identity, the method reroutes the call to a second device of the user associated with the second identity.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses methods, computer-readable media and devices for recommending communications to users and for rerouting calls to users. Although the present disclosure is discussed below in the context of wireless access networks and an Internet Protocol (IP) network, the present disclosure is not so limited. Namely, the present disclosure can be applied to packet switched or circuit switched networks in general, e.g., Voice over Internet Protocol (VoIP) networks, Service over Internet Protocol (SoIP) networks, Asynchronous Transfer Mode (ATM) networks, Frame Relay networks, and the like.

In one embodiment, the present disclosure provides an integrated context based identity management service. A first aspect relates to the creation of a relationship graph of a user. The user's contacts (broadly encompass friends, individuals with a relationship with the user, organizations or communities with a relationship with the user and so on), are derived from diverse data sources that are available to a network operator, such that the network is able to group the contacts of a user into different clusters, e.g., a family cluster, a work cluster, a cluster for a particular sports or hobby group, a school cluster, a professional association cluster and so forth. The graph may then be displayed for the user as part of the context based identity management service.

In another aspect, the present disclosure manages multiple identities of a user that are used for different purposes and to communicate with different people. In particular, the context based identity management service uses social relationship information and leverages the availability of various user identities of different users to manage incoming and outgoing communications. As one example, a first user may have configured the context based identity management service to block all incoming calls from unknown contacts at the first user's work telephone number. The first user may then receive a call from a second user at the first user's work telephone number. Normally, the call would be blocked. However, the context based identity management service may recognize that the second user and the first user are members of a same organization, e.g., members of the same sports club. The context based identity management service may automatically allow the second user to connect to the first user's home telephone number based upon the recognized relationship between the users.

In a second illustrative example, the context based identity management service may provide recommendations as to who to contact, how to contact and why to contact such contacts. For instance, the context based identity management service may recommend that the user contact his sister. It may also indicate the reason for the suggestion is that the user has not called his sister in more than 30 days. Further illustrative examples are described in greater detail below.

Figure 1:
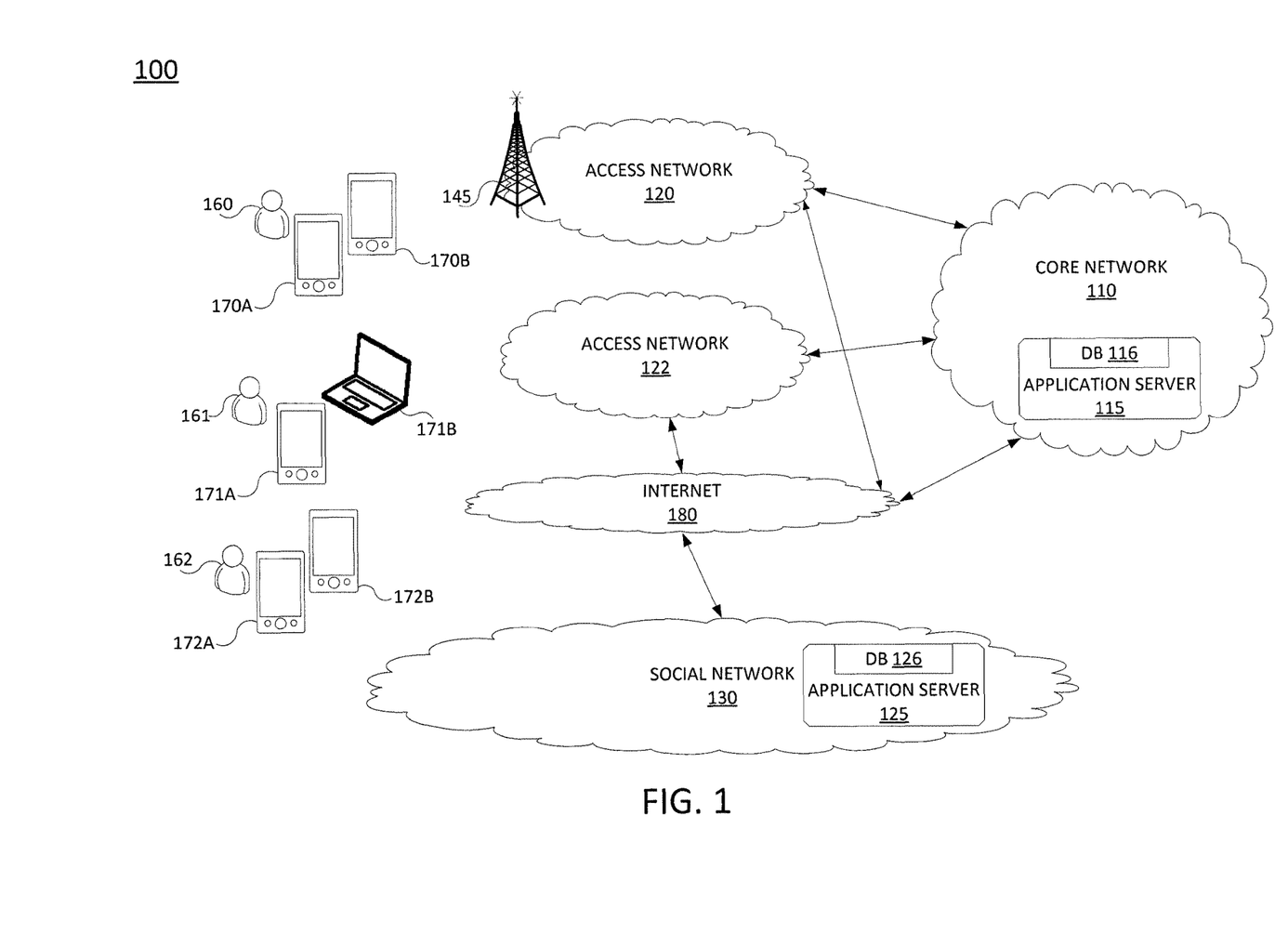
FIG. 1 illustrates an exemplary network related to the present disclosure.

To aid in understanding the present disclosure, FIG. 1 illustrates a block diagram depicting one example of a communication network 100 suitable for performing or enabling the steps, functions, operations and/or features described herein. The overall communication network 100 may include any number of interconnected networks which may use the same or different communication technologies, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2 G, 3 G, and the like), a long term evolution (LTE) network, and so forth. It should be noted that an IP network is broadly defined as a network that uses Internet Protocol to exchange data packets.

As shown in FIG. 1, the system 100 connects endpoint devices 170A-172A and 170B-172B with each other and/or with one or more application servers via a core network 110, access networks 120 and 122, social network 130 and/or Internet 180. In one embodiment, core network 110, e.g., an IP network, interfaces with one or more of the access networks 120 and 122, and may also include interfaces to the Internet 180 and/or social network 130. Access network 120 may comprise a wireless access network (e.g., an IEEE 802.11/Wireless Fidelity (Wi-Fi) network and the like) or a cellular access network, and may include a cellular base station and/or wireless access point 145. In one embodiment, access network 122 may comprise a PSTN access network, a cable access network, a wired access network and the like. In one embodiment, the access networks 120 and 122 and the core network 110 may be operated by different service providers, the same service provider or a combination thereof. Various interconnections between access networks 120 and 122, core network 110, Internet 180 and social network 130 are shown. In accordance with the present disclosure, it is contemplated that devices may utilize any one or a combination of such networks and interfaces in order to communicate with one another.

Figure 6:
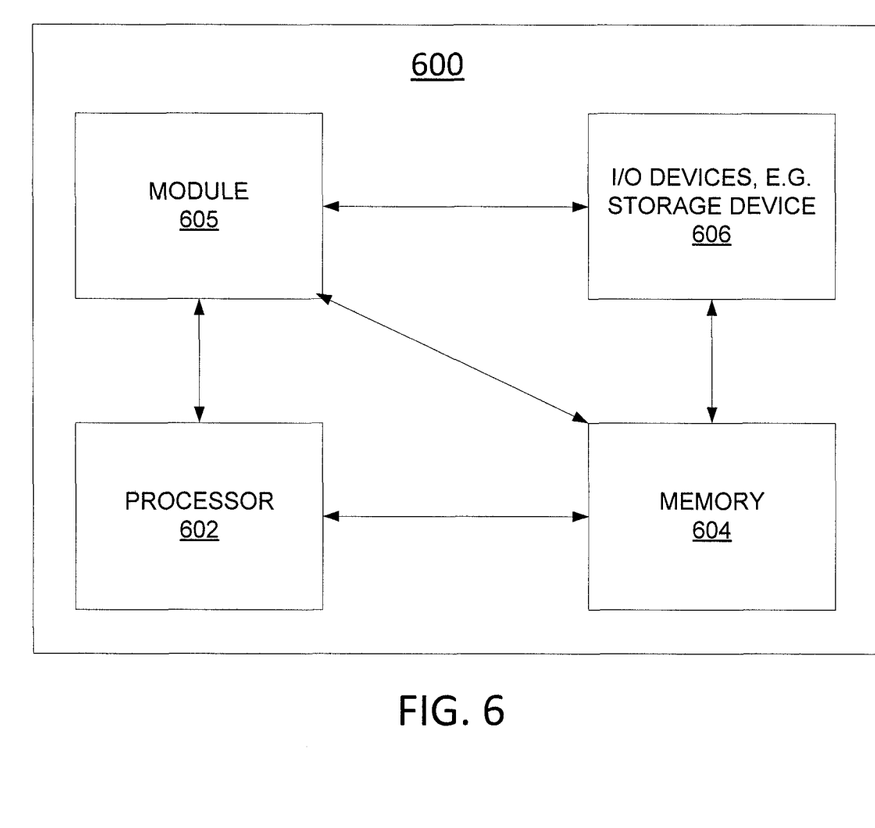
FIG. 6 illustrates a high-level block diagram of a general-purpose computer suitable for use in performing the functions described herein.

In one embodiment, the core network 110 may include an application server (AS) 115 and a database (DB) 116. Although only a single AS 115 and a single DB 116 are illustrated, it should be noted that any number of application servers 115 or databases 116 may be deployed. In one embodiment, the AS 115 may comprise a general purpose computer as illustrated in FIG. 6 and discussed below. In one embodiment, the AS 115 is configured to perform steps, functions and/or operations of a context based identity management service, e.g., for generating relationship graphs for users, for recommending communications to users and/or for rerouting communications to users in accordance with the present disclosure. As such, DB 116 may store program code, data, files, and so forth to enable such functions. Thus, various embodiments are described herein as residing in or being performed in whole or in part by AS 115. However, it should be noted that, social network 130 may include an application server (AS) 125 and a database (DB) 126, which may be the same or similar to AS 115 and DB 116 in the core network 110 and which are also suitable to perform at least the same functions. Similarly, in another embodiment a stand-alone application server (not shown), e.g., connected to Internet 180, may perform the same or similar functions. Examples of generating relationship graphs, recommending communications to users and rerouting communications to users are described in greater detail below in connection with FIGS. 2 and 3.

In one embodiment, each of endpoint devices 170A-172A and 170B-172B may comprise an endpoint device configured for wireless or wired communication such as a personal computer, a laptop computer, a Personal Digital Assistant (PDA), a mobile phone, a smart phone, an email device, a tablet, a messaging device, and the like. As illustrated in FIG. 1, endpoint devices 170A-172A and 170B-172B may belong to and/or be associated with users 160-162. In particular, each of users 160-162 may have multiple associated endpoint devices. For example, user 160 may have both a personal smart phone (e.g., endpoint device 170A) as well as a work smart phone assigned by an employer (e.g., endpoint device 170B). Similarly, user 161 may have both a mobile phone (e.g., endpoint device 171A) as well as a personal computer (e.g., endpoint device 170B). In addition, user 162 may also have a personal smart phone (e.g., endpoint device 172A) as well as a work smart phone assigned by an employer (e.g., endpoint device 172B).

Notably, one or more of the users 160-162 may be a subscriber of access network 120 and/or core network 110. Accordingly, in one embodiment DB 116 of AS 115 in core network 110 may store profile information of one or more of users 160-162, e.g., users who are also network subscribers. Taking user 160 as an example, the profile information stored in DB 116 may include a name, billing address, service address, telephone number and email address associated with user 160. The profile information may also include geographic location information regarding user 160. For example, location information may be determined from a source IP address associated with communications from user 160, global positioning system (GPS) information of a mobile device of the user, serving base station information, and so forth. The profile information stored in DB 116 may also comprise biographic information, e.g., age, memberships in various groups, professional associations, and so forth, as well as calendar information for the user 160. The profile may also include a contact list of the user 160 that may comprise various contacts in various categories including: friends, family, colleagues, sports team members, hobby group members, and so forth.

In one example, user 160 defines various groups and assigns different contacts to different groups. In one example, the contact list may include various different communication identities that can be used for different contacts. For example, the user may have only a telephone number for one contact. However, for another contact the user may store a number of communication identities such as: a home telephone number, a cellular telephone number, a work telephone number, an email address, an instant messaging username, a VoIP application username, and so forth.

To further illustrate, user 161 may be a work colleague of user 160. Thus, an entry in the contact list of user 160 for user 161 may include a work telephone number as well as a work email address of user 161. User 160 may also explicitly indicate that user 161 is a work contact, e.g., by entering "work" in a category field of the contact list entry. Similarly, user 162 may be user 160's sister. The contact list entry relating to user 162 may include a home telephone number, an email address and a work telephone number of the sister. In addition, user 160 may explicitly indicate a category of user 162 by entering "family" in a category field of the contact list entry.

Application server (AS) 115 may also access and/or store in DB 116 call detail records (CDRs) derived from telephone calls, emails, text messages, instant messages, multimedia messages (MMS), VoIP application usage, and the like which traverse various networks including core network 110, access networks 120 and 122, and so forth. Such CDRs may be gathered and accessed using any techniques which are well known in the art and may be used for various purposes in accordance with the present disclosure, as described in greater detail below.

In addition, each of the users 160-162 may participate in social networking via social network 130. Thus, each of the users 160-162 may have a social network profile that includes: posts and messages of the user, biographic information of the user, information on contacts of the user and/or other participants of the social network with whom the user has interacted, location/check-in information of the user, and so forth. In one example, the social network profiles of each of the users 160-162 may be stored in database (DB) 126 of application server (AS) 125. Collectively, the information stored in DB 126 may be referred to as social network information and may be used for determining status information regarding various contacts of a user, for determining a best identity to use to communicate with a contact and for performing other functions in accordance with the present disclosure. For instance, application server (AS) 115 may access the social network information from AS 125/DB126 and use such information as an alternative to or in conjunction with contact information and call detail record information available to AS 115.

It should be noted that the network 100 has been simplified. For example, the network 100 may include other network elements (not shown) such as border elements, routers, switches, policy servers, security devices, gateways, a content distribution network (CDN) and the like. Thus, FIG. 1 is only intended to illustrate one exemplary environment in which embodiments of the present disclosure may be employed.

Figure 2:
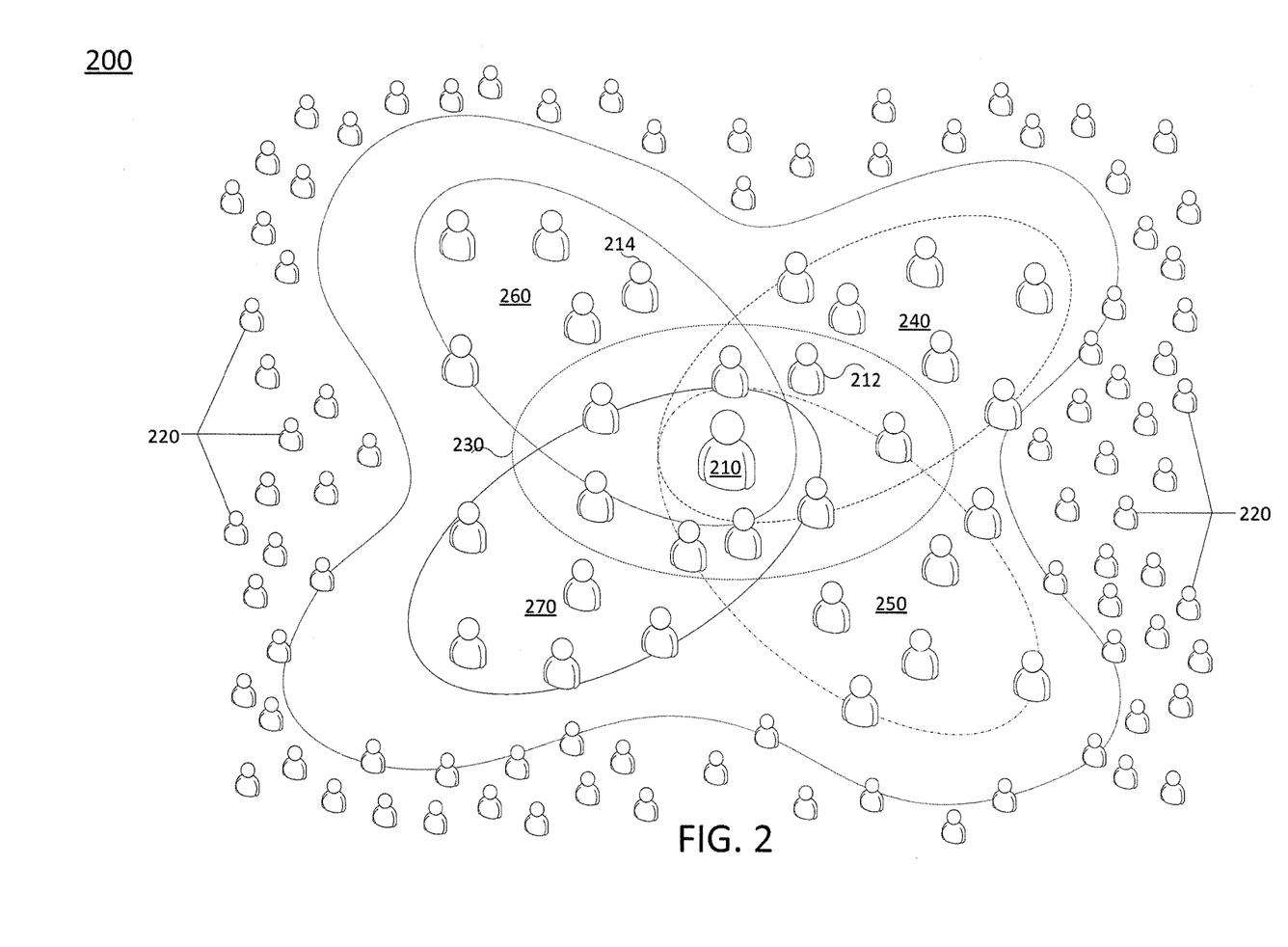
FIG. 2 illustrates a first example of a relationship graph of a user, in accordance with the present disclosure.

To further aid in understanding the present disclosure, FIG. 2 illustrates an exemplary relationship graph 200. For example, user 210 may subscribe to a context based identity management service, which may be provided by core network 110, e.g., via AS 115, or by another network and/or network component illustrated in FIG. 1.

In one embodiment, the network may use contact list information as well as social network information regarding user 210 to construct relationship graph 200. For example, the network may access the contact information for various contacts of user 210. The contact information may be obtained from a user profile, e.g., in a network hosted database, from a contact list stored on one or more of the user's endpoint devices, from a social network database, and so forth. In one example, the network may rely upon explicit relationship indicators in order to create the relationship graph. For example, the network may rely upon the fact that user 210 is explicitly linked to contact 214 as a social network contact or upon the fact that user 210 has explicitly indicated that contact 212 is a relative in a contact list entry. In one embodiment, the user 210's contacts are also derived from diverse data sources that are available to a network operator, such as call detail records from traditional and cellular telephone usage, text message, instant message and email usage, social network usage and so forth. Thus, through one or more of these available data sources, the network has insight into the relationships between and among many different users such that the network is ultimately able to group the contacts of a user into different communities or clusters, e.g., a family cluster, a work cluster, a cluster for a particular sports or hobby group, a school cluster, and so forth.

For instance, an initial graph may be created for user 210 which places user 210 in the center and which shows four clusters: 240, 250, 260 and 270. Contacts which are closer to user 210 are those who are deemed most relevant to the user and contacts which are further away are those which are deemed less relevant. In this example, there are a large number of contacts 220 which reside at the periphery of the relationship graph 200. These may represent many temporary contacts of the user. For example, the user 210 may keep an entry for his car mechanic in an address book/contact list, but may only call the mechanic on average once per year. In addition, the relationship between the user 210 and the mechanic may not involve any other common contacts. Thus, the mechanic does not fit well into any cluster and is not one of the most relevant contacts for the user.

On the other hand, cluster 240 may comprise family members of user 210. Each has a connection to user 210 and, since they are family members, also have connections to each other. Thus, these contacts of the user 210 form a cluster that is recognizable to the network. Similarly, cluster 250 may represent a hobby group that the user belongs to, e.g., a photography club. The user 210 may store contact information for various club members in his address book and may also have had actual communications including phone calls and text messages with different members. In addition, the other club members who are contacts of user 210 may also be contacts of one another such that the network recognizes these contacts as a cluster. Clusters 260 and 270 may be similarly formed and may represent respectively, a sports team to which user 210 belongs and work colleagues for a company. In one embodiment, the network may be unaware of the actual significance of the clusters. Thus, network may rely upon the user to ultimately label the different clusters 240-280, e.g., "family", "photography", "soccer team" and "work". However, in another embodiment, the network may deduce the identities in different way, e.g., the same last names, explicit relationship indications in social network profiles and/or contact list entries, explicit indications by users that they are members of a particular group, etc.

The relationship graph 200 also depicts a central region 230 which represents the most relevant contacts of user 210. In particular, since a user's number of contacts may be very great, a contact may be given a priority rating based on a relationship strength, an activity rating of the contact (how active is the contact at the moment in communications), a communication history with the user, and a location (if the contact is nearby to the user, he/she may be given a higher priority rating). Then based upon a preference of the user and/or a screen size and resolution of a display, some, but not necessarily all of the contacts are displayed in a graphical interface based on the priority ratings.

Figure 3:
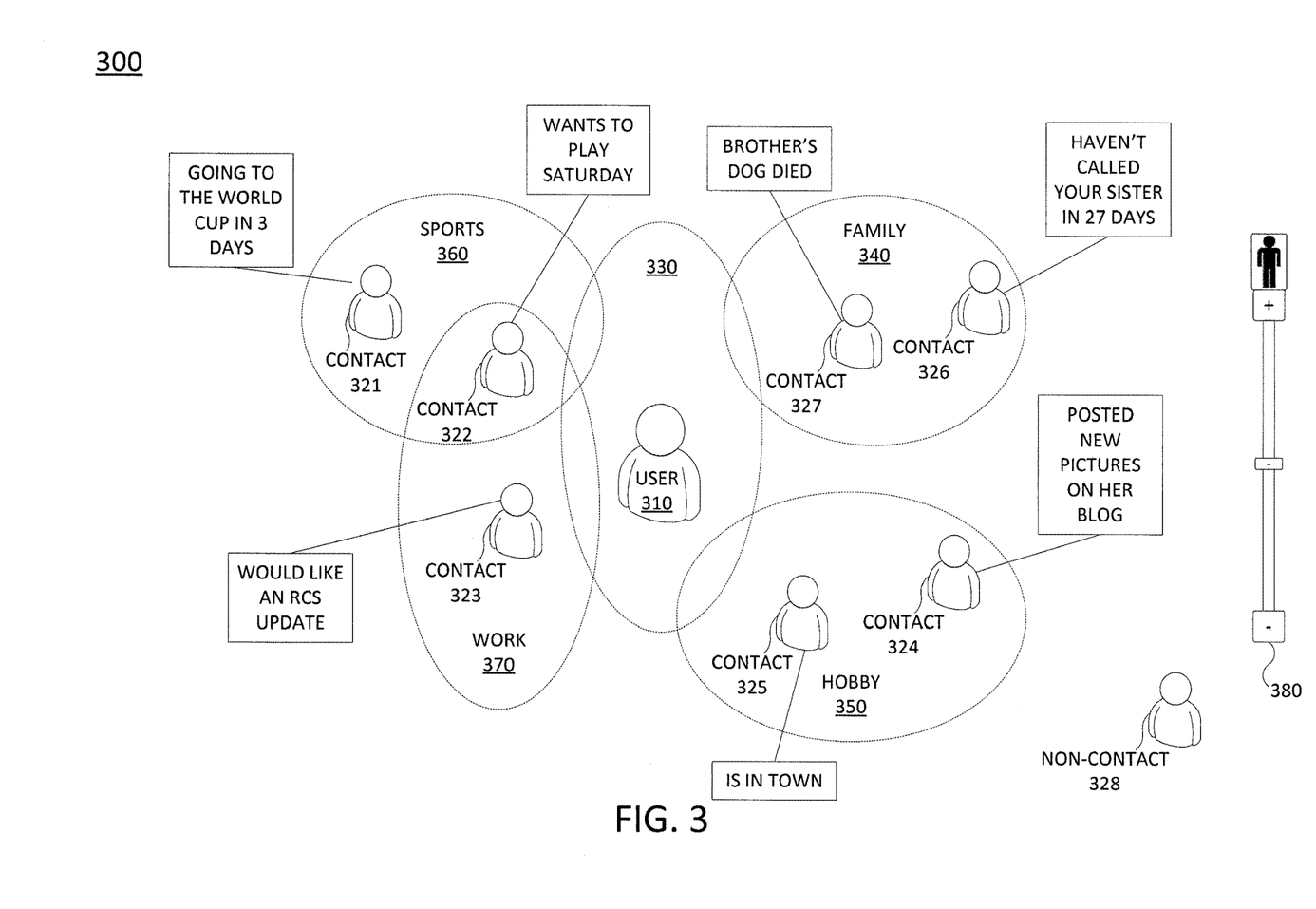
FIG. 3 illustrates a second example of a relationship graph of a user, in accordance with the present disclosure.

To further aid in understanding the present disclosure, FIG. 3 illustrates another exemplary relationship graph 300, which shows a more detailed view of the most relevant contacts of a user, e.g., user 310. For example, relationship graph 300 may comprise the central region 230 in FIG. 2 in greater detail. In the central cluster 330 of FIG. 3 is the user 310. Surrounding the user 310 are different clusters that include a family cluster 340, a hobby cluster 350, a sports cluster 360 and a work cluster 370. For illustrative purposes, only four clusters are illustrated in FIG. 3. However, it should be understood that a typical user may have many more clusters, or even fewer clusters, depending upon the number of various social groups to which the user belongs, the extent to which the user participates in communication network-based and social network-based services, and so forth.

Notably, in addition to constructing a relationship graph, the network may perform various functions to provide communication recommendations to users. For example, the network may recommend that user 310 should communicate with one of his/her contacts based upon updated status information or context information detected for the contact. For example, the prioritization and selection of contacts that are shown in FIG. 3 can be based on a variety of context information types, including events (e.g., the occurrence or future occurrence of an event such as posting or tagging of a picture of the user, announcement of a date for a concert event, and the like), historical (e.g., historical interaction or behavior such as calling a child every day at a particular time, texting a parent every weekend, and the like), and relationship information (e.g., relationship based on family ties such as a parent, a child, a sibling and the like; relationship based on the number of interactions such as how often the user calls or have not called in a number of days, and the like; relationship based on the type of interactions such as work or business related interactions, customer-provider related interactions, client-vendor related interactions and the like). Broadly, status information or context information may refer to various data points which are available with respect to different users and contacts, and which may be gleaned from information available to the network. For example, status information or context information may include communications and parameters relating thereto (e.g., calling party, called party, timestamp, mode of communication), passage of time between communications, a volume of communications in a given time period, a subject of the communications, location information, calendar information, profile status information, and so forth.

As a first example, the network may detect that user 310 has not communicated with his sister, contact 326 for more than 30 days, e.g., as determined from call detail records, social network interactions (or lack thereof), and so forth. The network may determine that this is an event of interest and recommend to user 310 that he should call his sister. In one embodiment, the network may explicitly indicate the reason for the suggestion is that user 310 has not called his sister in more than 30 days.

In one example, the recommendation is tailored for different groups/clusters or contact types of the user 310. For example, the network may prompt user 310 to contact close family members after more than 30 days of no communication, whereas it may prompt user 310 to contact friends after more than 60 days of no contact. These time periods may be alternatively specified by the user or may be defaults set by a network operator. In another example, the network infers appropriate time periods based upon observing the usual behaviors of user 310 and his contacts. For example, based on CDRs, social network interactions, and so forth, the network may determine that user 310 and his sister, contact 326, usually communicate at least once or twice per week. Therefore, if say more than four weeks, or some other duration of time passes beyond which user 310 and contact 326 do not communicate, the network may determine that this is an event of interest and may recommend to user 310 that he should call his sister.

In another example, it is possible that the dog of contact 327 (e.g., user 310's brother) has just died, which has generated a large volume of correspondence (phone calls, social network messages, text messages, etc.). In one example, the network may be able to determine the subject of the communications, e.g., by detecting keywords across various messages sent to the contact in a particular time period. However, in another example, the network is not necessarily aware of the subject of the communications. Rather, the network may only be aware that there is an unusually high volume of communications to contact 327, signifying an event of interest. To further illustrate, the network may have a baseline level of communication which the network observes related to the particular contact. The network may then declare an event of interest if there is a certain threshold percentage greater volume of communication in a given time period. For example, at least a 50% spike in communications during a 12 hour period relating to the contact may be declared an event of interest. Thresholds of this nature may be set by a network operator and/or by the user in accordance with the present disclosure.

In another example, updated status information relating to contact 325 may indicate that contact 325 is proximate to user 310 in terms of physical location. If contact 325 is within a certain radius from user 310, this may signify an event of interest. Thus, the network may recommend that user 310 communicate with contact 325. For example, contact 325 may be a friend/contact of user 310 who lives in San Francisco, while user 310 lives in New York City. Contact 325 may be in Chicago visiting family while user 310 may also be in Chicago for a business convention. Using updated status information, e.g., location information of both user 310 and contact 325 derived from cell phone location information, social network location status information, etc., the network may determine that contact 325 is sufficiently proximate such that a recommendation should be sent to user 310 to communicate with his friend, contact 325. In this example, the network may also indicate that the reason for the recommendation is that contact 325 is physically located nearby, e.g., within a certain number of miles. In one embodiment, a proximity threshold may be set by a network operator and/or by the user 310. For example, user 310 may specify that he should receive communication recommendations when contact 325 is within a 100 mile radius, while another distance threshold may be set for user 310's sister, contact 326, who may live in a neighboring town and who user 310 may see all the time. In this case, a distance threshold for recommending that user 310 contact his sister may be that the two are within 200 yards and so on.

In still another example, the network may recommend that user 310 communicate with contact 324 when contact 324 has posted new social network information, e.g., a status update, new photographs, a blog entry, and so forth. For example, the network may determine that in the past user 310 has always or often looked at new posts from contact 324 and left comments on the new posts. Therefore, the network may determine that the posting of a new photograph from contact 324 is a type of updated status information worthy of declaring an event of interest. As such, the network may bring it to the attention of user 310 by recommending that user 310 should communicate with contact 324.

In another example, the network may be aware that contact 323 is user 310's boss and has requested an "RCS update". The network may determine, based upon the relationship between user 310 and contact 323 (employee-boss relationship) that the outstanding request from contact 323 is an event of interest and may recommend to user 310 that he should respond promptly.

In another example, contact 322 may be both a work colleague of user 310 and a team member on the same soccer team. Thus, contact 322 is in both the sports cluster 360 and the work cluster 370. Contact 322 may also message the user 310 inviting user 310 to play on Saturday. The network may also observe the duration of time that has passed without a reply from user 310. After a sufficient time has passed, the network may determine that it is an event of interest in order to recommend that user 310 should respond. For example, the network may make such a determination after a certain number of days have passed since the request was sent. Alternatively, the network may make such a determination when it is within a certain number of days prior to the subject of the request or prior to an RSVP date. For instance, the network may suggest that user 310 should respond to contact 322 if it is within two days of Saturday's soccer match and the user has not yet responded.

In yet another example, contact 321 may have made a significant announcement, in this case, that he is going to see the World Cup in three days. The network may therefore recommend to user 310 that he should communicate with contact 321. For example, announcements with respect to certain categories, e.g., major sporting events, concerts, weddings, and so forth may be deemed events of interest such that the network recommends to user 310 to communicate with the announcing contact. In one example, a contact may explicitly indicate the subject of an announcement, e.g., as part of social network post or blog entry. In addition, in one example the user 310 may explicitly indicate categories of announcements which should be deemed as events of interest.

In one example, each recommendation to the user may also include a recommended identity to use to call the contact and/or a recommended time/date to communicate with the contact. In particular, one aspect of the context based identity management service of the present disclosure comprises determining which identities (both of the user and of the contact) to use to communicate with a contact. For example, the network may recommend that user 310 should contact his sister, contact 326, after 5:00 pm at a home telephone number. The recommendation may be based upon a past success in reaching contact 326 at the home telephone number after 5:00 pm on weeknights. As an example, this information can be gleaned from call detail records (CDRs) which indicate whether an attempted call was successfully connected or whether the call failed, was routed to voicemail, and so on. Over many CDRs, it can be inferred what telephone number, email address, username or other identity is most likely to reach the intended recipient. The recommendation may also be based upon presence information of the contact, e.g., logged-in status on a social network or messaging application, physical location information and so forth.

In another example, contact 322 has invited user 310 to play soccer on Saturday, but user 310 has not yet responded. Contact 322 is both a work contact and a sports contact. However, the network may determine that the communication is personal/sports related and is not work related. Therefore, the recommendation may include a preferred identity of the user 310 to use to reach contact 322 as well as a preferred identity of contact 322 to which to send the communication. For example, the network may recommend that user 310 use his personal cell phone number or personal email address to communicate with contact 322 at his personal cell phone number or personal email address. On the other hand, the recommendation may instead suggest to the user 310 to send a text message to the personal mobile phone number of the contact 322 (e.g., because the communication is sports related and not work related) between 6:00 and 7:00 pm (e.g., because there is a history of successfully sending text messages to contact 322 at this time, because there is a history of contact 322 not answering telephone calls at this time, or because the contact's calendar information indicates that his is busy and not likely answering calls, and so forth).

In one embodiment, relationship graph 300 may comprise part of a graphical user interface of the context based identity management service of the present disclosure. For example, user 310 may view his relationship graph 300 on a screen and be able to click on different clusters and individual contacts to enter additional screens with even more refined details. For example, if user 310 clicks on contact 322, he may be taken to an additional screen or may receive a pop-up window with biographic information, contact details, calendar information, social network status information, a communication history and so forth regarding contact 322. In one example, recommendations provided by the context based identity management service are shown to the user 310 via the relationship graph 300. For instance, a dialog box may appear on or near an icon or picture representing a contact to signify that a communication is being recommended. In addition, the dialog box may include the indication, or reason for the recommendation. However, in another example, the network may send communication recommendations to user 310 via automated phone calls, text messages, emails and so forth. For instance a network-based application server implementing a context based identity management service of the present disclosure may send such communications itself and/or may cause one or more other network components to forward recommendations to users via these various communication formats.

The network may also perform functions related to rerouting a call to the user 310. In particular, the network may perform identity management for incoming calls to user 310. For example, user 310 may have multiple identities that are used for communications, e.g., multiple email addresses, multiple telephone numbers, cell phone numbers, and application identities such as Skype identities, WhatApp identities, and so forth. User 310 may use these different identities for different purposes and to communicate with different people. Thus, user 310 may specify certain rules as to when and how different users may contact and be contacted by the user. For instance, a user may not want to interact with personal friends using a work email or a work telephone number. Similarly, user 310 may prefer that business contacts not be able to reach the user outside of business hours. In one example, these rules or preferences may be stored as part of a subscriber profile of user 310 stored in the network.

In one particular example, user 310 may configure a rule to block all incoming calls from unknown contacts at user 310's work telephone number. Thereafter, user 310 may receive a call from non-contact 328 at user 310's work telephone number. Normally the call would be blocked. However, the network may recognize that user 310 and non-contact 328 are part of the same running group (e.g., based upon indications in user 310's and non-contact 328's respective social network profiles obtained from a social network). In addition, another rule provided by user 310 may specify that members of the running group may contact the user 310 at his home telephone number. User 310 may have inadvertently or purposely listed his work telephone number in a running group newsletter instead of his home telephone number. Accordingly, the network may automatically enable non-contact 328 to connect to user 310's home telephone number based upon the recognized relationship between user and the non-contact (both are part of the same running group) and the fact that user 310 has included a rule permitting running group members to contact his home telephone number. However, non-contact 328 may not be aware that the call was redirected.

Notably, in one example, user 310 and non-contact 328 are both subscribers to a context based identity management service of the network such that the necessary information is made available to the network to enable it to make such determinations. It should also be noted that in this case, user 310 and non-contact 328 have not previously communicated, are not listed as contacts in respective address books/contact lists, are not social network contacts, etc. However, because (1) both are part of the context based identity management service, (2) both have indicated an affiliation with a same organization, and (3) user 310 has indicated a rule with respect to callers that are members of the organization, the network can appropriately reroute the call according to the user-defined rule.

As another example, the network may implement a rule specified by user 310 that during business hours, all calls to a personal mobile phone should be sent to voicemail, but that calls from family members may be automatically forwarded to a work telephone number. In still another example, the network may implement a rule specified by user 310 that calls from members of a hobby group receive a particular voice message whereas calls from members of a sports team receive a different voice message. For example, user 310 may be organizing a sporting event and a hobby event for different groups of people. One of the messages may provide information regarding the sporting event for interested callers and another of the messages may provide information regarding the hobby event for other callers that are part of the hobby group. Notably, the network may infer the appropriate message to play for a caller based upon caller information that indicates the caller is part of one group or the other.

For instance, in one embodiment the network may determine that a first caller is part of a sports team (e.g., contact 321 is calling) and that a second caller is part of a hobby group (e.g., contact 325 is calling) based upon social network profile information of the first caller and the second caller respectively. Alternatively, the network may determine that the caller belongs to a particular category, cluster or group based upon an indication provided by user 310. For example, the user 310 may indicate a category of a contact in an entry for the contact in user 310's address book. Alternatively, or in addition, an initial relationship graph 300 may have been constructed for user 310. User 310 may then have proceeded to label or define the different clusters in the graph as specific groups, e.g., family cluster 340, a hobby cluster 350, a sports cluster 360 and a work cluster 370. Thus, the membership of a caller in a particular category may be based upon which cluster(s) the caller is assigned to in user 310's relationship graph 300.

In one embodiment, the screen display as shown in FIG. 3 may be provided with a slide interface or icon 380 to zoom in or out. This slide interface or icon 380 allows the user to selectively enlarge or decrease the number of recommended contacts that are shown on the display screen. For example, if the user is very busy, the user may only want to see recommendations of contacts that the user should contact. Alternatively, if the user is not very busy, the user may want to see more recommendations of contacts that the user should contact. Thus, the slide interface or icon 380 allows the user to customize the recommendations to be displayed on the display screen.

Additionally, in one embodiment selecting a contact from the main screen enables the user to view additional context information, and communication capabilities. The communication capabilities may actually allow the user to launch communication, e.g., an email link, a text message session and the like. Furthermore, if a user selects (e.g., clicks) on a group (e.g., social circle or cluster), then the user may "dive deeper" into the social circle, e.g., showing additional information for the group or each member of the group. For example, if the user clicks on a photography group from the main view, the method will provide a more detailed view of only the photography related contacts.

Figure 4:
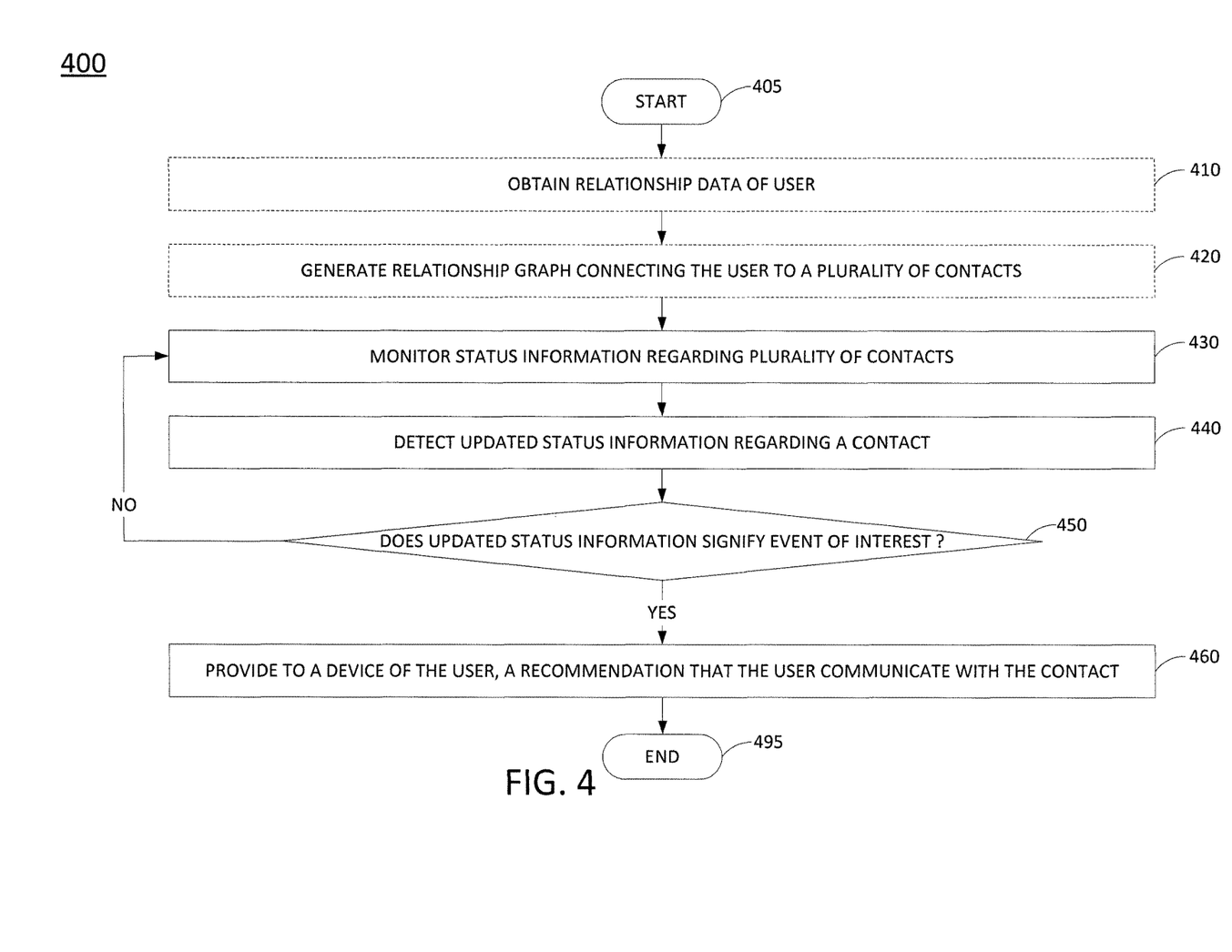
FIG. 4 illustrates a flowchart of a method for recommending a communication, in accordance with the present disclosure.

FIG. 4 illustrates a flowchart of a method 400 for recommending a communication, according to the present disclosure. In one embodiment, steps, functions and/or operations of the method 400 may be performed by a network-based device, e.g., application server 115, in FIG. 1. In one embodiment, the steps, functions, or operations of method 400 may be performed by a computing device or system 600, and/or processor 602 as described in connection with FIG. 6 below. For illustrative purpose, the method 400 is described in greater detail below in connection with an embodiment performed by a processor, such as processor 602. The method begins in step 405 and proceeds to optional step 410.

At optional step 410, the processor obtains relationship data of a user. For example, the processor may derive relationship data from contact lists/address books of the user, as well as from contact lists/address books of contacts of the user, social network connection information, call detail records, and so forth. In one example, the relationship information indicates an extent of communication between the user and one or more contacts.

At optional step 420, the processor generates a relationship graph of the user connecting the user to a plurality of contacts. For example, step 420 may comprise generating a relationship graph such as illustrated in FIG. 2 and/or FIG. 3 and as described above having a number of different clusters for different groups of contacts of the user. In one example, different contacts of the user are prioritized based upon an extent of communication between the user and different contacts. For example, contacts who the user has communicated with most recently or most often may be displayed closer to the user.

At step 430, the processor monitors status information regarding a plurality of contacts. For example, the status information may comprise new communications from and to the contact and parameters relating thereto (e.g., calling party, called party, timestamp, mode of communication), passage of time between communications, a volume of communications in a given time period, a subject of the communications, location information, calendar information, social network profile information, and so forth. In one embodiment, the status information may be obtained from the same or similar sources from which the relationship data was obtained at step 410.

At step 440, the processor detects updated status information regarding at least one contact. For example, the processor may detect that: the location information of the contact has changed, that the relative distance between the user and the contact has changed, the contact has a new post on a social network site, the contact has made a status updated to his social network profile or engaged in other social network activity, the contact has changed presence information with respect to one or more devices or application accounts, the contact has changed his calendar information, a significant duration of time has passed since a request was sent to the user to which the user has not yet responded, the contact has generated a large volume of communication in a relatively small time period, the contact has made a significant announcement, and so forth.

In step 450, the processor determines whether the updated status information signifies an event of interest. For example, as described above a change in location information of a contact relative to the user may bring the user within a proximity threshold of the user such that it is deemed an event of interest. In another example, if a number of communications relating to the contact exceed a threshold and/or increases a certain percentage above a normally observed volume of communications for the contact, this may be declared an event of interest. In still another example, if the contact has made a request of the user and a certain amount of time has passed without the user responding, this may also be declared an event of interest. Similarly, if a certain duration of time has passed in which the user and a contact have not communicated, the processor may declare that this is an event of interest.

If the updated status information is not determined to signify and event of interest, the method returns to step 430 where the processor continues to monitor status information regarding a plurality of contacts of the user. However, if the updated status information is determined to signify an event of interest, then the method proceeds to step 460.

In step 460, the processor provides to a device of the user a recommendation that the user communicate with the contact. In one example, the recommendation includes an indication of the event of interest. For example, if the event of interest is that the contact has recently generated a large volume of communication, the recommendation may indicate this fact to the user at step 460 when making the recommendation.

In one example, the recommendation also includes a suggested identity to use to communicate with the contact. For example, the contact may have multiple identities such as a home telephone number, a work telephone number, a social networking username, and so forth from which a preferred identity may be selected to recommend to the user. The recommendation may further include a suggested time to communicate with the contact. For example, the recommendation may be based upon the particular relationship between the user and the contact, a history of success or failure in communicating with the contact at different times, and so forth.

Following step 460, the method 400 proceeds to step 495 where the method ends.

Figure 5:
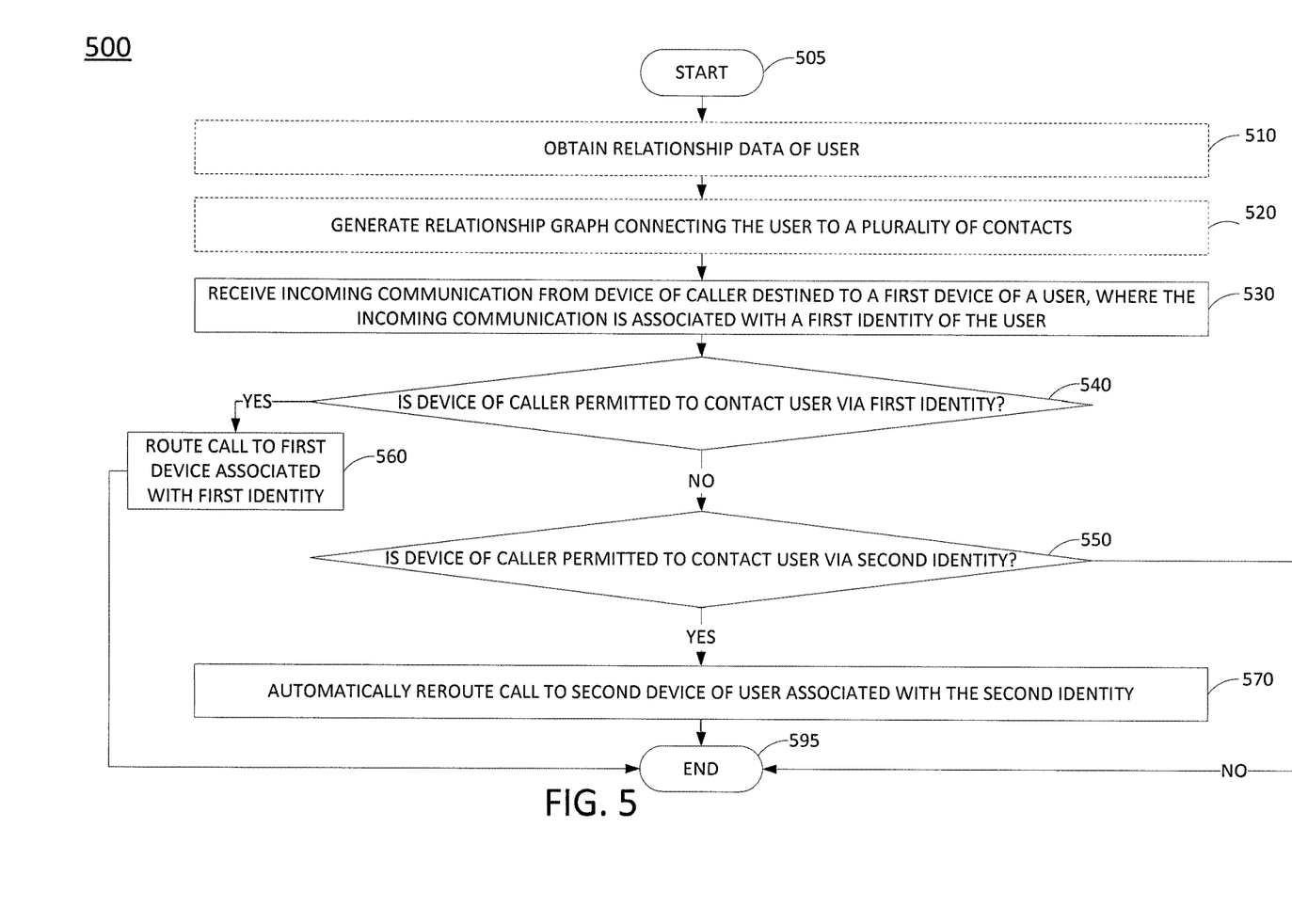
FIG. 5 illustrates a flowchart of a method for rerouting a call, in accordance with the present disclosure.

FIG. 5 illustrates a flowchart of a method 500 for rerouting a call, according to the present disclosure. In one embodiment, steps, functions and/or operations of the method 500 may be performed by a network-based device, e.g., application server 115, in FIG. 1. In one embodiment, the steps, functions, or operations of method 500 may be performed by a computing device or system 600, and/or processor 602 as described in connection with FIG. 6 below. For illustrative purpose, the method 500 is described in greater detail below in connection with an embodiment performed by a processor, such as processor 602. The method begins in step 505 and proceeds to optional step 510.

At optional step 510, the processor obtains relationship data of a user. For example, the processor may perform the same or similar functions to those discussed above in connection with step 410 of the method 400.

At optional step 520, the processor generates a relationship graph of the user connecting the user to a plurality of contacts. For example, the processor may perform the same or similar functions to those discussed above in connection with step 420 of the method 400.

At step 530, the processor receives an incoming communication from a device of a caller to a first device of the user. In particular, the incoming communication may be directed to a first identity of the user that is associated with the first device. For instance, the communication may be a telephone call that is directed to a work telephone number of the user. Notably, the user may have several different communication devices and several different communication identities which are associated with specific devices and/or which are available across different devices. For instance, a work telephone number may be tied to a particular phone, whereas a VoIP application username may be associated with one or several different devices depending upon when and where the user logs in to the application.

At step 540, the processor determines whether the device of the caller is permitted to contact the user via the first identity. For example, the user may specify a rule that only authorized callers in a white list are permitted to contact the user at his work telephone. Similarly, various other rules may be specified by the user for incoming communications in accordance with the present disclosure. If the caller is permitted to contact the user at the first identity, the method proceeds to step 560.

At step 560, the processor sends or allows the communication to be sent to the first device without rerouting. Following step 560, the method proceeds to step 595 where the method ends. If, however, the device of the caller is not permitted to contact the user via the first identity, then the method proceeds to step 550.

In step 550, the processor determines whether the device of the caller is permitted to contact the user via a second identity. For example, the user may explicitly indicate that members of certain groups may connect to the user via his home telephone, e.g., alumni of the same college, running group members, photography group members, etc. In this example, the caller may actually be a contact of the user who is contained in the relationship graph of the user. For example, the caller may be a family member who is calling the wrong number (the user's work number). The user may designate that family members or other groups/clusters in his social graph have different permissions for contacting the user via different identities. However, in another example the caller may be a member of the organization designated by the user but is someone who is also unknown to the user. In the latter case, the processor may determine that the caller is a member of the designated organization and is permitted to contact the user via the second identity based upon an indication by the caller, e.g., in a subscriber profile or in a social network profile of the caller, that the caller is a member of such a group. In any case, if the device of the caller is permitted to contact the user via the second identity, then the method proceeds to step 570. However, if the caller is not part of such a group, the processor may block the call, drop the call, reroute the call to play an announcement, and so forth. In addition, the method may proceed to step 595 where the method ends.

In step 570, the processor automatically reroutes the communication to a second device of the user associated with the second identity. For example, if the communication is a telephone call originally destined to a work phone of the user, the processor may cause the call to be rerouted to a home telephone of the subscriber. Similarly, if the communication was a text message to a work cell phone of the user, the processor may cause the text message to be rerouted or diverted to a personal cell phone of the user. It should be noted that the foregoing are only several examples of call rerouting in accordance with the present disclosure. Thus, various other scenarios are possible depending upon the rules and preferences of the user, the availability of different types of information to the processor, and so forth.

Following step 570, the method 500 proceeds to step 595 where the method ends.

It should be noted that although not specifically specified, one or more steps, functions or operations of the respective methods 400 and/or 500 may include a storing, displaying and/or outputting step as required for a particular application. In other words, any data, records, fields, and/or intermediate results discussed in the respective methods can be stored, displayed and/or outputted to another device as required for a particular application. Furthermore, steps or blocks in FIGS. 4 and 5 that recite a determining operation or involve a decision do not necessarily require that both branches of the determining operation be practiced. In other words, one of the branches of the determining operation can be deemed as an optional step.

FIG. 6 depicts a high-level block diagram of a general-purpose computer or system suitable for use in performing the functions described herein. For example, any one or more components or devices illustrated in FIG. 1 or described in connection with the methods 400 or 500 may be implemented as the system 600. As depicted in FIG. 6, the system 600 comprises a hardware processor element 602 (e.g., a central processing unit (CPU), a microprocessor, a multi-core processor and the like), a memory 604, (e.g., random access memory (RAM), read only memory (ROM), a disk drive, an optical drive, a magnetic drive, and/or a Universal Serial Bus (USB) drive), a module 605 for providing a context based identity management service, and various input/output devices 606, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like). Although only one processor element is shown, it should be noted that the general-purpose computer may employ a plurality of processor elements. Furthermore, although only one general-purpose computer is shown in the figure, if the method(s) as discussed above is implemented in a distributed manner for a particular illustrative example, i.e., the steps of the above method(s) or the entire method(s) are implemented across multiple general-purpose computers, then the general-purpose computer of this figure is intended to represent each of those multiple general-purpose computers.

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps functions and/or operations of the above disclosed methods. The processor executing the computer readable or software instructions relating to the above described method(s) can be perceived as a programmed processor or a specialized processor. In one embodiment, the present module or process 605 for providing a context based identity management service can be implemented as computer-executable instructions (e.g., a software program comprising computer-executable instructions) and loaded into memory 604 and executed by hardware processor 602 to implement the functions as discussed above. As such, the present module or process 605 for providing a context based identity management service as discussed above in methods 400 and 500 (including associated data structures) of the present disclosure can be stored on a non-transitory (e.g., tangible or physical) computer-readable storage device or medium, e.g., RAM memory, magnetic or optical drive or diskette and the like. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a recommendation, the method comprising:

detecting, by a processor deployed in a telecommunication service provider network, updated status information regarding a contact of a user, wherein the contact comprises an individual or an organization with a relationship with the user, wherein the updated status information comprises a plurality of communications from other users to the contact, wherein the plurality of communications comprises social network messages on a subject based on a detected keyword;

determining, by the processor, whether the updated status information signifies an event of interest, wherein the updated status information is determined to signify the event of interest when a number of the plurality of communications from the other users to the contact exceeds a first threshold;

determining, by the processor, a suggested identity to be used in communicating with the contact, wherein the suggested identity is determined from historical communication records of the user having successfully communicated with the contact using the suggested identity; and providing, by the processor to a device of the user, the recommendation that the user should communicate with the contact when the updated status information is determined to signify the event of interest, wherein the recommendation includes an indication of the event of interest, wherein the recommendation is to be presented on a display of the device of the user, wherein the recommendation further includes the suggested identity to use to communicate with the contact, wherein the suggested identity is selected from a plurality of identities that the user is able to use in communicating with the contact, wherein the suggested identity comprises at least one of: one of a plurality of email addresses of the user, or one of a plurality of phone numbers of the user.

2. The method of claim 1, wherein the updated status information further comprises:

a duration of time since the user last communicated with the contact, wherein the updated status information is determined to signify the event of interest when the duration of time exceeds a second threshold.

3. The method of claim 1, wherein the updated status information further comprises:
a duration of time since the contact made a request to the user, where the user has not yet replied to the request, wherein the updated status information is determined to signify the event of interest when the duration of time exceeds a second threshold.

4. The method of claim 1, wherein the updated status information further comprises:
a location of the contact, wherein the updated status information is determined to signify the event of interest when the location is proximate to the user.

5. The method of claim 1, wherein the updated status information is obtained from at least one of the historical communication records, each of the historical communication records comprising at least one of:
a social network activity record; or
a call detail record of a communication network.

6. The method of claim 1, wherein the recommendation is based upon relationship information associated with the user and the contact.

7. The method of claim 1, wherein the recommendation further includes:
a suggested time to communicate with the contact, wherein the suggested time is selected based upon an availability of the contact using the suggested identity.

8. The method of claim 1, further comprising:
obtaining relationship data of the user, the relationship data including information regarding an extent of communication between the user and each of a plurality of contacts of the user;
generating a relationship graph connecting the user to the plurality of contacts; and
monitoring updated status information of the plurality of contacts.

9. The method of claim 8, wherein the relationship data is obtained from social network data of the user.

10. The method of claim 8, wherein the relationship data is obtained from call detail record data of the user.

11. The method of claim 8, wherein the relationship data is obtained from a contact list of the user.

12. A computer-readable storage device storing instructions which, when executed by a processor deployed in a telecommunication service provider network, cause the processor to perform operations for providing a recommendation, the operations comprising:
detecting updated status information regarding a contact of a user, wherein the contact comprises an individual or an organization with a relationship with the user, wherein the updated status information comprises a plurality of communications from other users to the contact, wherein the plurality of communications comprises social network messages on a subject based on a detected keyword;
determining whether the updated status information signifies an event of interest, wherein the updated status information is determined to signify the event of interest when a number of the plurality of communications from the other users to the contact exceeds a threshold;
determining a suggested identity to be used in communicating with the contact, wherein the suggested identity is determined from historical communication records of the user having successfully communicated with the contact using the suggested identity; and
providing, to a device of the user, the recommendation that the user should communicate with the contact when the updated status information is determined to signify the event of interest, wherein the recommendation includes an indication of the event of interest, wherein the recommendation is to be presented on a display of the device of the user, wherein the recommendation further includes the suggested identity to use to communicate with the contact, wherein the suggested identity is selected from a plurality of identities that the user is able to use in communicating with the contact, wherein the suggested identity comprises at least one of: one of a plurality of email addresses of the user, or one of a plurality of phone numbers of the user.

13. The computer-readable storage device of claim 12, wherein the updated status information further comprises:
a duration of time since the user last communicated with the contact, wherein the updated status information is determined to signify the event of interest when the duration of time exceeds a second threshold.

14. The computer-readable storage device of claim 12, wherein the updated status information further comprises:
a duration of time since the contact made a request to the user, where the user has not yet replied to the request, wherein the updated status information is determined to signify the event of interest when the duration of time exceeds a second threshold.

15. The computer-readable storage device of claim 12, wherein the updated status information further comprises:
a location of the contact, wherein the updated status information is determined to signify the event of interest when the location is proximate to the user.

16. The computer-readable storage device of claim 12, wherein the updated status information is obtained from at least one of the historical communication records, each of the historical communication records comprising at least one of:
a social network activity record; or
a call detail record of a communication network.

17. The computer-readable storage device of claim 12, wherein the recommendation is based upon relationship information associated with the user and the contact.

18. The computer-readable storage device of claim 12, wherein the recommendation further includes:
a suggested time to communicate with the contact, wherein the suggested time is selected based upon an availability of the contact using the suggested identity.

19. The computer-readable storage device of claim 12, the operations further comprise:
obtaining relationship data of the user, the relationship data including information regarding an extent of communication between the user and each of a plurality of contacts of the user;
generating a relationship graph connecting the user to the plurality of contacts; and
monitoring updated status information of the plurality of contacts.

20. An apparatus comprising:
a processor deployed in a telecommunication service provider network; and
a computer-readable storage device storing a plurality of instructions which, when executed by the processor, cause the processor to perform operations, the operations comprising:
detecting updated status information regarding a contact of a user, wherein the contact comprises an individual or an organization with a relationship with the user, wherein the updated status information comprises a plurality of communications from other users to the contact, wherein the plurality of communications comprises social network messages on a subject based on a detected keyword;

determining whether the updated status information signifies an event of interest, wherein the updated status information is determined to signify the event of interest when a number of the plurality of communications from the other users to the contact exceeds a threshold;

determining a suggested identity to be used in communicating with the contact, wherein the suggested identity is determined from historical communication records of the user having successfully communicated with the contact using the suggested identity; and providing, to a device of the user, the recommendation that the user should communicate with the contact when the updated status information is determined to signify the event of interest, wherein the recommendation includes an indication of the event of interest, wherein the recommendation is to be presented on a display of the device of the user, wherein the recommendation further includes the suggested identity to use to communicate with the contact, wherein the suggested identity is selected from a plurality of identities that the user is able to use in communicating with the contact, wherein the suggested identity comprises at least one of: one of a plurality of email addresses of the user, or one of a plurality of phone numbers of the user.

* * * * *